United States Patent
Moroi et al.

[11] Patent Number: 5,943,991
[45] Date of Patent: *Aug. 31, 1999

[54] HEATER UTILIZING FLUID FRICTIONAL HEAT

[75] Inventors: Takahiro Moroi; Takashi Ban, both of Aichi-ken, Japan

[73] Assignee: Kabushiki Kaisha Toyoda Jidoshokki Seisakusho, Aichi-ken, Japan

[ * ] Notice: This patent is subject to a terminal disclaimer.

[21] Appl. No.: 08/956,213

[22] Filed: Oct. 22, 1997

[30] Foreign Application Priority Data

Nov. 21, 1996 [JP] Japan ................................. 8-311008

[51] Int. Cl.$^6$ .............................. F02N 17/02; F22B 3/06
[52] U.S. Cl. ..................... 123/142.5 R; 122/26; 126/247
[58] Field of Search ..................... 123/142.5 R; 432/219, 432/221; 126/247; 122/26

[56] References Cited

U.S. PATENT DOCUMENTS

| | | | |
|---|---|---|---|
| 4,271,790 | 6/1981 | Ahmed et al. | 122/26 |
| 4,424,797 | 1/1984 | Perkins | 126/247 |
| 4,483,277 | 11/1984 | Perkins | 122/26 |
| 4,501,231 | 2/1985 | Perkins | 122/26 |
| 4,561,681 | 12/1985 | Perkins | 122/26 |
| 4,685,443 | 8/1987 | McMurtry | 126/247 |
| 4,798,176 | 1/1989 | Perkins | 122/26 |
| 4,993,377 | 2/1991 | Itakura | 123/142.5 R |
| 5,188,090 | 2/1993 | Griggs | 126/247 |
| 5,704,320 | 1/1998 | Ban et al. | 123/142.5 R |

*Primary Examiner*—Henry C. Yuen
*Assistant Examiner*—Hai Huynh
*Attorney, Agent, or Firm*—Morgan & Finnegan, L.L.P.

[57] ABSTRACT

A heater utilizing fluid frictional heat according to this invention has a structure suitable for realizing the heater in an elongated shape which is capable of being mounted laterally on an automobile engine. A cylindrical shear applying portion being integral with a drive shaft and having an outer circumferential surface in cylindrical form is disposed in a heat generating chamber formed as a cylindrical space. The shear applying portion is machined with the same support arbors as used in machining the drive shaft. Preferably, the drive shaft and the shear applying portion are machined as a one-piece member made of a single rod-like material.

10 Claims, 3 Drawing Sheets

HEATER UTILIZING FLUID FRICTIONAL HEAT

BACKGROUND OF THE INVENTION

1. Field of the Invention

The present invention relates to a heater utilizing fluid frictional heat in which heat is generated in a viscous fluid by shearing to heat a fluid circulating through a heat receiving chamber which is used as a heating source.

2. Description of the Related Art

Hitherto, a heater utilizing fluid frictional heat for use in an automobile heating apparatus is disclosed in U.S. Pat. No. 4,993,377 issued Feb. 19, 1991 to Masato Itakura and its corresponding Japanese Patent, Japanese Patent Application Laid-open No. 2-246823 filed Mar. 21, 1989. In this disclosed heater utilizing fluid frictional heat, a front and a rear housings are fastened together by through bolts in opposite relation to define therein a heat generating chamber and a water jacket, i.e., a heat receiving chamber, around the heat generating chamber. Circulating water is admitted into the water jacket through an inlet port, and circulates in the water jacket, and then flows out of an outlet port to an external heating circuit. A drive shaft is rotatably supported by a bearing unit in the front housing, and a rotor which is rotatable in the heat generating chamber is fixed on the drive shaft to serve as a shear applying portion. Labyrinth grooves are formed in close relation to each other between a wall surface forming the heat generating chamber and an outer surface of the rotor. A viscous fluid such as a silicone oil is placed in a gap between the wall surface forming the heat generating chamber and the outer surface of the rotor.

When the above heater utilizing fluid frictional heat is assembled in an automobile heating apparatus and the drive shaft is driven by the engine, the rotor rotates in the heat generating chamber and the shearing force, being proportional to the number of revolutions of the rotor, is applied to the viscous fluid in the labyrinth grooves. This allows internal energy and frictional heat in the viscous fluid to increase, causing the viscous fluid to generate heat. The high temperature viscous fluid thus heated is heat exchanged with the circulating water in the water jacket, and the thereby heated circulating water flows out to the heating circuit to heat the automobile passenger compartment.

In the conventional heater utilizing fluid frictional heat mentioned above, the rotor has a large diameter relative to its axial length, and therefore generates most of the heat on its front and rear surfaces. Stated in another way, the rotor is configured to have a short axial length, but a large diameter. Recently, however, automobile engine compartments have become very cramped with a variety of devices mounted therein so, from the space point of view, it is difficult to mount a heater having such a large-diameter rotor. Thus there is a demand for the development of a heater which has an elongated shape and which can be disposed laterally along an engine.

SUMMARY OF THE INVENTION

The present invention has been made in view of the above-stated problem, and an object of the present invention is to provide a heater utilizing fluid frictional heat which has a suitable elongated structure that is capable of being mounted, by way of example, on an automobile engine laterally.

To achieve the above object, according to a first aspect of the present invention, there is provided a heater utilizing fluid frictional heat comprising a heat generating chamber, a heat receiving chamber for circulating a fluid therethrough in close relation to the heat generating chamber, a shear applying portion disposed in the heat generating chamber capable of being rotated by a drive shaft, a viscous fluid placed in the gap between a wall surface forming the heat generating chamber and an outer surface of the shear applying portion that generates heat upon rotation of the shear applying portion, wherein the heat generating chamber is formed as a cylindrical space, the shear applying portion and the drive shaft are prepared as a cylindrical member integrated with each other, the outer surface of the shear applying portion is machined to be cylindrical with the same support arbors as used in machining the drive shaft, and the shear applying portion is coaxially disposed in the heat generating chamber.

Also, according to a second aspect of the present invention, there is provided a heater utilizing fluid frictional heat comprising a heat generating chamber, a heat receiving chamber for circulating a fluid therethrough in close relation to the heat generating chamber, a shear applying portion disposed in the heat generating chamber capable of being rotated by a drive shaft, a viscous fluid placed in the gap between a wall surface forming the heat generating chamber and an outer surface of the shear applying portion that generates heat upon rotation of the shear applying portion, wherein the heat generating chamber is formed as a cylindrical space, the shear applying portion and the drive shaft are machined as a one-piece member made of a single rod-like material, and the shear applying portion has the outer surface formed cylindrically and is coaxially disposed in the heat generating chamber.

With any of the heaters utilizing fluid frictional heat according to the first and second aspects of the present invention, a gap is defined between the cylindrical wall surface forming the heat generating chamber and the outer cylindrical circumferential surface of the shear applying portion. In this gap, the viscous fluid is subjected to a shearing force that is proportional to the number of revolutions of the shear applying portion. This allows internal energy and frictional heat in the viscous fluid to increase, causing the viscous fluid to generate heat.

Furthermore, because the inner space of the heat generating chamber and the outer surface of the shear applying portion are both cylindrical, the heater utilizing fluid frictional heat can be realized in an elongated shape.

It is conceivable to prepare the shear applying portion having the outer cylindrical circumferential surface as a separate part from the drive shaft, assemble the shear applying portion on a drive shaft (by, e.g., forming a shaft hole for the drive shaft through the axial center of the shear applying portion and press-fitting the drive shaft into the shaft hole), and place the shear applying portion, assembled on the drive shaft, in the cylindrical heat generating chamber. In this case, however, a misalignment of the centers of the two parts occurs because different support arbors are set up when machining the outer circumferential surface of the shear applying portion, the shaft hole through the shear applying portion, and the outer circumferential surface of the drive shaft. Assembly play and offset press-fitting, etc. also occur. Since two cylindrical surfaces are extended in close face to face proximity over a long axial distance between the heat generating chamber and the shear applying portion after assembly, misalignment of the centers makes contact more likely to occur between the cylindrical wall surface forming the heat generating chamber and the outer cylindrical circumferential surface of the shear applying portion. Therefore to avoid such contact, the size of the gap must be increased. However increasing the gap size lowers the amount of heat generated by the viscous fluid per unit area of the outer circumferential surface of the shear applying portion. This gives rise to a problem in that the diameter and length of the heat generating chamber must be increased to compensate for the lower amount of heat generated. A heater utilizing fluid frictional heat with a larger outer configuration is the result.

With the first aspect of the present invention, on the contrary, since the outer circumferential surface of the shear applying portion is machined with the same support arbors as used in machining the outer circumferential surface of the drive shaft, the above-stated errors such as misalignment of the centers in machining, assembly play and offset press-fitting are eliminated. Accordingly, the degree of misalignment of the centers of the heat generating chamber and the shear applying portion after assembly is small, so the gap between the cylindrical wall surface forming the heat generating chamber and the outer circumferential surface of the shear applying portion can be made smaller. It is thus possible to remarkably increase the amount of heat generated by the viscous fluid per unit area of the outer circumferential surface of the shear applying portion, reduce the diameter and length of the heat generating chamber, and reduce the size of the heater utilizing fluid frictional heat.

With the second aspect of the present invention, since the drive shaft and the shear applying portion are machined from a single rod-like material, both the outer circumferential surfaces of the drive shaft and the shear applying portion are necessarily machined with the same support arbors without respectively setting their centers. Accordingly, errors such as misalignment of the centers in machining, assembly play, and offset press-fitting are eliminated. Therefore as with the first aspect of the present invention, the gap between the cylindrical wall surface forming the heat generating chamber and the outer circumferential surface of the shear applying portion can be made smaller. Hence it is also possible to remarkably increase the amount of heat generated by the viscous fluid per unit area of the outer circumferential surface of the shear applying portion and reduce the size of the heater utilizing fluid frictional heat.

Further, with the second aspect of the present invention, since the step of assembling the drive shaft and the shear applying portion to each other is no longer needed, manufacture of both the parts is made simpler and easier and the production cost can be reduced.

BRIEF DESCRIPTION OF THE DRAWINGS

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

DESCRIPTION OF THE PREFERRED EMBODIMENTS

Preferred embodiments of the present invention will now be described in detail with reference to FIGS. 1 to 3.

Figure 1:
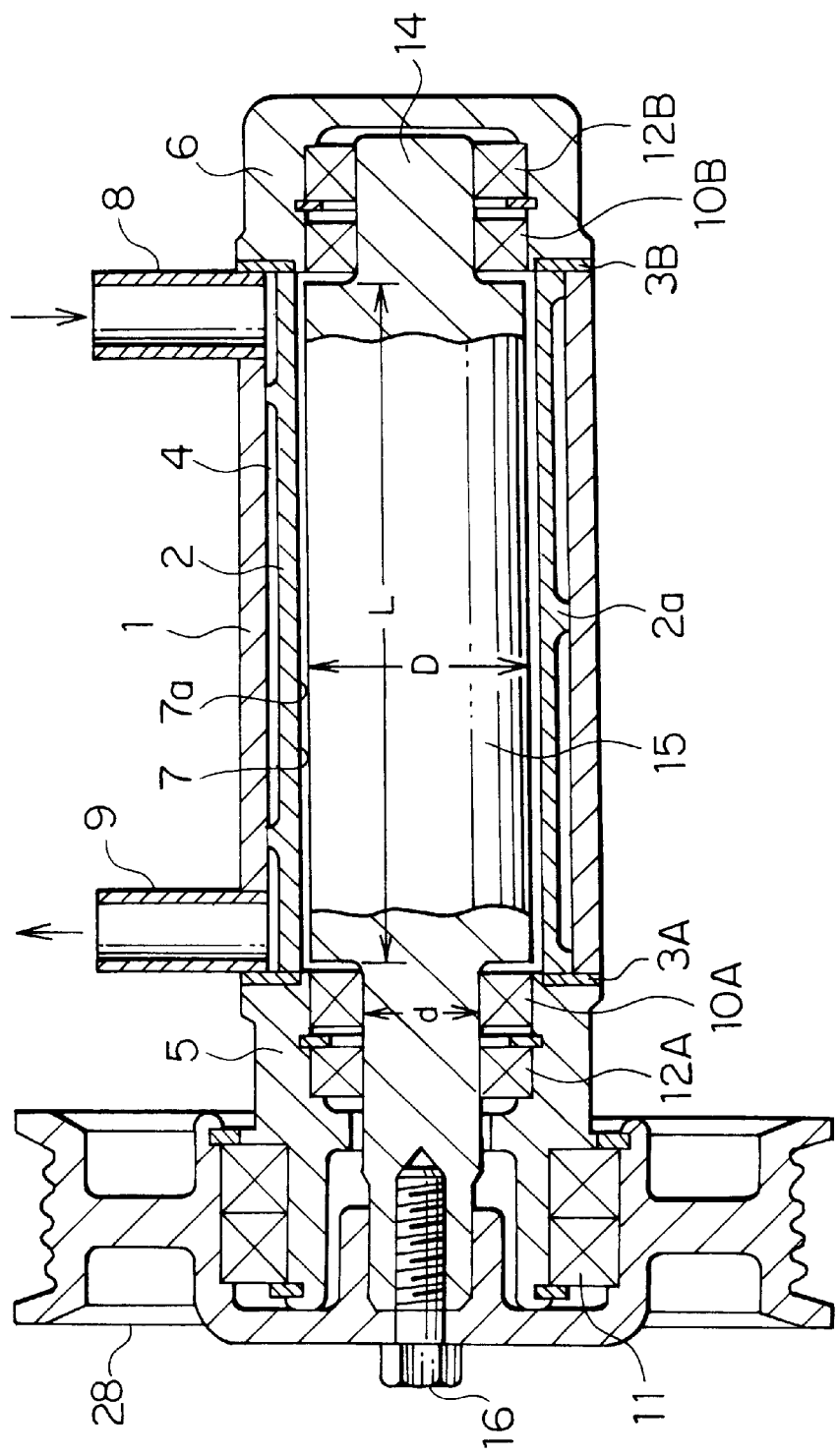
FIG. 1 is a sectional view showing the general construction of a heater utilizing fluid frictional heat according to a preferred embodiment of this invention.

A heater utilizing fluid frictional heat of a preferred embodiment is constructed as shown in FIG. 1. A cylinder block 2, being substantially cylindrical in shape, is press-fitted or inserted in a cylindrical intermediate housing 1. A front housing 5 and a rear housing 6 are joined respectively to the front ends and the rear ends of the intermediate housing 1 and the cylinder block 2 through gaskets 3A, 3B. Within the cylinder block 2, a heat generating chamber 7 is defined in the form of a cylindrical space. Further, a rib 2a is spirally projected on an outer circumferential surface of the cylinder block 2, i.e., on an outer surface of a cylindrical wall forming the heat generating chamber 7. The rib 2a is held in contact with an inner circumferential surface of the intermediate housing 1 to define a spiral fluid passage which serves as a heat receiving chamber 4. Note that fins may be additionally provided projecting from the cylinder block 2 into the heat receiving chamber 4 to increase a contact area between the circulating water, as a heat-exchanging fluid, which circulates through the heating chamber 4 and the cylindrical wall forming heat generating chamber 7. However, the rib 2a also functions as such fins.

Figure 3:
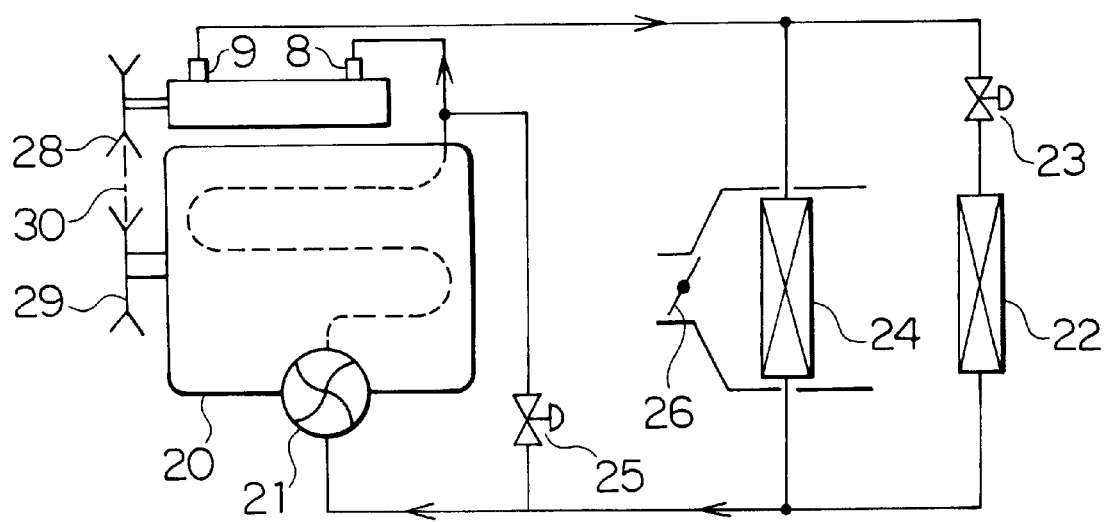
FIG. 3 is a heating circuit diagram including the heater of the preferred embodiment.

On the same side along an outer circumferential surface of the intermediate housing 1, i.e., on one side (upper side as shown in FIGS. 1, 3) of the heat receiving chamber 4, an inlet port 8 for admitting the circulating water from an external heating circuit into the chamber 4 is projected at the rear end, and an outlet port 9 for the flow of circulating water out of the chamber 4 to the heating circuit is projected at the front end in the same direction as the inlet port 8.

A drive shaft 14 is rotatably supported by the front housing 5 and the rear housing 6 through shaft sealing units 10A, 10B and bearing units 12A, 12B, respectively. An intermediate portion of the drive shaft 14 is formed to have an outer circumferential surface in a cylindrical shape with a sectional diameter D being somewhat larger than a sectional diameter d at the front end of the drive shaft 14. The shaft portion having the larger sectional diameter D serves as a shear applying portion 15. The shear applying portion 15 is formed by cutting a single rod-like material to be a one-piece member integral with the drive shaft 14. The shear applying portion 15 is thus shaped to have an axial length L much larger than the sectional diameter D.

Figure 2:
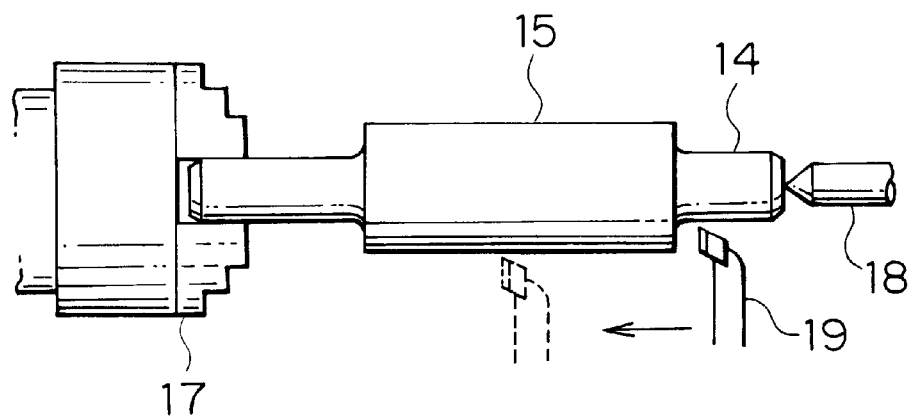
FIG. 2 is an explanatory view of a process of machining a drive shaft and a shear applying portion for use in the preferred embodiment.

Further, both the outer circumferential surfaces of the shear applying portion 15 and the drive shaft 14 are cut by moving a cutter 19 along those outer circumferential surfaces successively, without replacing supports 17, 18 disposed at the right and left ends, as shown in FIG. 2. In other words, the same support arbors are employed during the machining of both the outer circumferential surfaces.

The shear applying portion 15 thus formed is coaxially disposed in the heat generating chamber 7 while the drive shaft 14 is rotatably supported by the front and rear housings 5, 6, as stated above. In this condition, a small gap 7a is formed between the inner cylindrical wall surface forming the heat generating chamber 7 and the outer cylindrical circumferential surface of the shear applying portion 15.

A silicone oil, as a viscous fluid, is placed in the gap 7a. In this condition, if the silicone oil is placed to completely fill the volume of the gap 7a, the heat generated cause the silicone oil to expand and leak. For this reason, when the gap 7a is filled with the silicone oil, about 20% volume of air is maintained in the gap.

A pulley 28 is fixed to a front end of the drive shaft 14 by a bolt 16 through a shaft bearing unit 11 provided between the pulley 28 and the front housing 5.

The heater utilizing fluid frictional heat of this embodiment is disposed in a heating circuit wherein engine cooling water is circulated to carry out heat radiation or heating, and is employed as an auxiliary heat source for automobile heating.

An automobile heating circuit which employs the heater utilizing fluid frictional heat of this embodiment is disposed on the outlet side of an engine 20, as shown in FIG. 3. A serial circuit comprising a radiator 22 and a thermostat 23 connected in series, and a heating coil 24 are connected in parallel between the outlet port 9 and a circulating pump 21 disposed on the inlet side of the engine 20. Also, a bypass circuit including a thermostat 25 is connected between the outlet side of an engine 20 and the inlet side of the circulating pump 21. The thermostat 23 is opened when the temperature of the engine cooling water as a fluid for heating is high, and the thermostat 25 is opened when the temperature of the engine cooling water is low. Additionally, the heating coil 24 is equipped with an opening/closing damper 26 which is opened during heating and disposed in a ventilation passage.

Further, as shown in FIG. 3, the heater utilizing fluid frictional heat is arranged to extend along a lateral surface of the automobile engine 20 parallel to a crankshaft (not shown), and is driven by the engine 20 through pulleys 28, 29, a belt 30 and an electromagnetic clutch (not shown) for turning on/off the heater utilizing fluid frictional heat.

The heater utilizing fluid frictional heat thus constructed operates as follows: the drive shaft 14 is driven by the engine 20 through the pulley 28, etc., the shear applying portion 15 rotates in the heat generating chamber 7, whereupon the viscous fluid, e.g. the silicone oil, is subjected to a shearing force to generate heat in the gap 7a. The circulating water is admitted into the inlet port 8 and flows through the heat receiving chamber 4 without causing a short or stagnation, because the heat receiving chamber 4 is shaped in the form of a spiral passage. When passing through the heat receiving chamber 4, the circulating water is sufficiently heated through the cylindrical wall forming the heat generating chamber 7 by the heat generated in the viscous fluid. The heated circulating water then flows out to the above-mentioned heating circuit through the outlet port 9 for automobile heating.

If the shear applying portion 15 is assembled as a separate part on the drive shaft, the gap 7a must be increased to avoid interference, e.g., contact, between the cylindrical wall surface forming the heat generating chamber and the outer circumferential surface of the shear applying portion, because misalignment of the centers of the heat generating chamber and the shear applying portion after assembly becomes large due to working errors such as misalignment in machining, assembly play and offset in press-fitting. In this embodiment, however, the shear applying portion 15 and the drive shaft 14 are cut into predetermined shapes from a single rod-like material, and therefore working errors such as assembly play and offset in press-fitting are eliminated. This cutting process necessarily results in the support arbors used in cutting the outer circumferential surface of the shear applying portion 15 being the same as those used in cutting the outer circumferential surface of the drive shaft 14. Working errors resulting from misalignment of the centers in machining are thereby eliminated. In the heater utilizing fluid frictional heat of this embodiment, therefore, the gap 7a between the cylindrical wall surface forming the heat generating chamber 7 and the outer circumferential surface of the shear applying portion 15 can be made smaller.

As a result, an amount of heat generated by the heater utilizing fluid frictional heat can be increased remarkably. More specifically, assuming that the viscosity coefficient of the viscous fluid is $\mu$, the sectional radius of the shear applying portion 15 is R (equal to D/2), the size of the gap 7a between the cylindrical wall surface forming the heat generating chamber 7 and the outer circumferential surface of the shear applying portion 15 is $\delta$, the angular velocity of the shear applying portion 15 is $\omega$, and the amount Q of heat generated by the heater utilizing fluid frictional heat is expressed by:

$$Q = 2\pi \mu \omega^2 R^3 L / \delta$$

Accordingly, the smaller the gap size $\delta$, the larger the amount Q of heat generated remarkably will be.

Also, in this embodiment, since no heat receiving chambers are formed at either the front and rear outside end wall surfaces of the heat generating chamber 7 in the axial direction, the heater is not required to have a large sectional area in the radial direction. Stated in another way, the above-mentioned construction is very suitable for an elongated heater having a large axial length.

Further, since the shear applying portion 15 is cut from a single rod-like material together with the drive shaft 14, equipment and operation necessary for assembling the shear applying portion 15 on the drive shaft 14 can be dispensed with. Consequently, manufacture of parts can be made simpler and easier and the production cost can be reduced.

Figure 4:
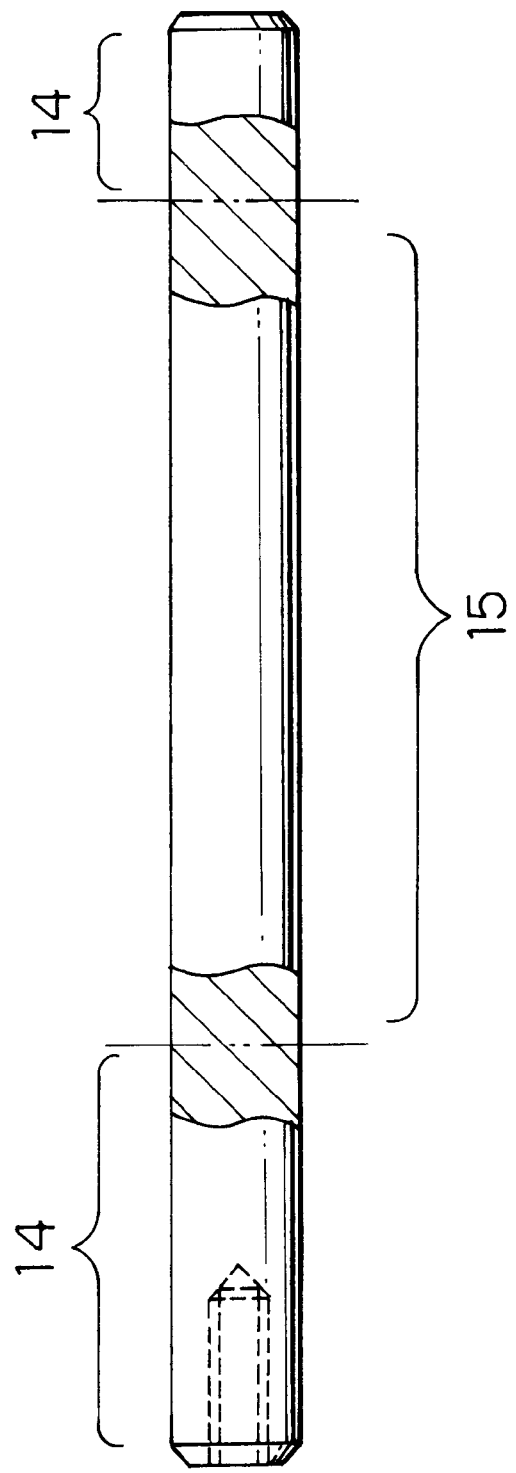
FIG. 4 is a view of a drive shaft and a shear applying portion for use in another preferred embodiment.

In the above embodiment, the shear applying portion 15 is formed such that its sectional diameter D is somewhat larger than the sectional diameter d of the drive shaft 14. In another embodiment, the sectional diameter D of the shear applying portion 15 may be equal to the sectional diameter d of the drive shaft 14 so that the shear applying portion 15 and the drive shaft 14 have the same diameter over the entirety of both parts, as shown in FIG. 4. This configuration is not only favorable in forming an elongated heater, but also enables the outer circumferential surface of the shear applying portion 15 and the outer circumferential surface of the drive shaft 14 to be machined in exactly the same manner. The production cost can therefore be further reduced.

In the automobile heating circuit constructed as stated above, when the temperature of the cooling water is high, the thermostat 23 is opened and the thermostat 25 is closed causing the cooling water to flow through the radiator 22 to dissipate the waste heat of the engine 20 into the open air. On the other hand, when the cooling water temperature is low, the thermostat 23 is closed and the thermostat 25 is opened, whereby the cooling water does not flow to the radiator 22 and is returned to the engine 20 without dissipating heat into the open air. When heating is required, the opening/closing damper 26 in the ventilation passage for the heating coil 24 is opened so that air in an automobile passenger compartment is circulated and heated by the cooling water flowing through the heating coil 24. However, when the cooling water temperature is low as for example, at start-up of the engine 20, a heating effect cannot be developed by the cooling water alone. Accordingly, the heater utilizing fluid frictional heat is driven, and the cooling water heated by the heater is sent to the heating coil 24 to heat the air circulating in the automobile passenger compartment.

As explained above, the heater utilizing fluid frictional heat, when arranged in the heating circuit, is disposed along the lateral surface of the engine 20, and the inlet port 8 and the outlet port 9 are both projected on one side of the heater utilizing fluid frictional heat. With this construction, the manufacture of the heater is facilitated, fluid pipes can be easily arranged in the cramped space of the engine compartment, and the heater can be mounted in automobiles more conveniently.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A heater utilizing fluid frictional heat comprising a hollow cylindrical heat generating chamber, a heat receiving chamber for circulating a fluid therethrough in close relation to said heat generating chamber, a cylindrical drive shaft, a cylindrical shear applying portion disposed in said heat generating chamber to be rotatable by said drive shaft, and a gap defined between a wall surface forming said heat generating chamber and an outer surface of said shear applying portion for containing a viscous fluid, in which heat can be generated upon rotation of said shear applying portion, wherein said heat generating chamber is formed as a cylindrical space, said cylindrical shear applying portion and said cylindrical drive shaft being a one-piece member, the outer surface of said cylindrical shear applying portion being machined to be cylindrical with the same support arbors as used in machining said cylindrical drive shaft, said shear applying portion being coaxially disposed in said heat generating chamber.

2. The heater utilizing fluid frictional heat according to claim 1, wherein said drive shaft includes an end portion supported by a housing and a sectional diameter of said shear applying portion is larger than a sectional diameter of the end portion.

3. The heater utilizing fluid frictional heat according to claim 1, wherein said drive shaft includes an end portion supported by a housing and a sectional diameter of said shear applying portion is equal to a sectional diameter of the end portion.

4. The heater utilizing fluid frictional heat according to claim 1, wherein said heat receiving chamber is positioned only radially outward from the cylindrical wall surface forming said heat generating chamber.

5. The heater utilizing a fluid frictional heat according to claim 4, further comprising an inlet port and an outlet port on one side of said heat receiving chamber for the flow of a fluid for heating.

6. A heater utilizing fluid frictional heat comprising a hollow cylindrical heat generating chamber, a heat receiving chamber for circulating a fluid therethrough in close relation to said heat generating chamber, a cylindrical drive shaft, a cylindrical shear applying portion formed integrally with said cylindrical drive shaft and disposed in said cylindrical heat generating chamber for rotation by said drive shaft, and a gap defined between a wall surface forming said hollow cylindrical heat generating chamber and an outer surface of said shear applying portion for containing a viscous fluid, wherein heat is generated upon rotation of said shear applying portion, said cylindrical shear applying portion and said cylindrical drive shaft being machined as a one-piece member of a single rod-like material, said shear applying portion being coaxially disposed in said cylindrical heat generating chamber.

7. The heater utilizing fluid frictional heat according to claim 6, wherein said drive shaft includes an end portion supported by a housing, a sectional diameter of said shear applying portion being larger than a sectional diameter of the end portion.

8. The heater utilizing fluid frictional heat according to claim 6, wherein said drive shaft includes an end portion supported by a housing and a sectional diameter of said shear applying portion is equal to a sectional diameter of the end portion.

9. The heater utilizing fluid frictional heat according to claim 6, wherein said heat receiving chamber is positioned only radially outward from the cylindrical wall surface forming said heat generating chamber.

10. The heater utilizing fluid frictional heat according to claim 9, further comprising an inlet port and an outlet port on one side of said heat receiving chamber for the flow of a fluid for heating.

* * * * *